(12) United States Patent
Röck et al.

(10) Patent No.: US 11,032,654 B2
(45) Date of Patent: Jun. 8, 2021

(54) METHOD FOR PROVIDING SOUND TO PERSONS DURING A TALK AND SYSTEM FOR PERFORMING THE METHOD

(71) Applicant: SONOVA AG, Staefa (CH)

(72) Inventors: Hans-Ueli Röck, Hombrechtikon (CH); Hilmar Meier, Zürich (CH); Harald Krueger, Affoltern am Albis (CH); Manuela Feilner, Egg (CH)

(73) Assignee: SONOVA AG, Staefa (CH)

( * ) Notice: Subject to any disclaimer, the term of this patent is extended or adjusted under 35 U.S.C. 154(b) by 0 days.

(21) Appl. No.: 16/486,807

(22) PCT Filed: Feb. 5, 2018

(86) PCT No.: PCT/EP2018/052764
§ 371 (c)(1),
(2) Date: Aug. 16, 2019

(87) PCT Pub. No.: WO2018/153642
PCT Pub. Date: Aug. 30, 2018

(65) Prior Publication Data
US 2020/0037074 A1 Jan. 30, 2020

(30) Foreign Application Priority Data
Feb. 23, 2017 (CH) ................. 000209/2017

(51) Int. Cl.
*H04R 25/00* (2006.01)
*H04W 76/10* (2018.01)
(Continued)

(52) U.S. Cl.
CPC ......... *H04R 25/554* (2013.01); *H04L 12/189* (2013.01); *H04L 65/60* (2013.01);
(Continued)

(58) Field of Classification Search
USPC .... 381/2, 23.1, 58, 59, 60, 61, 77, 150, 312
See application file for complete search history.

(56) References Cited

U.S. PATENT DOCUMENTS

| 8,249,261 B2 | 8/2012 | Kiepfer et al. |
| 2003/0165239 A1 | 9/2003 | Bantz et al. |
| (Continued) | | |

FOREIGN PATENT DOCUMENTS

| DE | 102007053832 A1 | 5/2009 |
| EP | 2866470 A1 | 4/2015 |
| (Continued) | | |

OTHER PUBLICATIONS

English translation of the Written Opinion of the International Searching Authority dated Apr. 30, 2018 in corresponding PCT Application No. PCT/EP2018/052764.
(Continued)

*Primary Examiner* — Yosef K Laekemariam
(74) *Attorney, Agent, or Firm* — MH2 Technology Law Group LLP

(57) ABSTRACT

A method for the broadcasting of sound to persons (10, 20, 30) with mobile hearing systems (11, 21, 31) at a meeting with a speaker (1) and with an audiovisual system (2, 3, 4), the audiovisual system having a computer (2), a screen (3) and a microphone (4). The method comprises the steps: receiving first data from a first mobile hearing system (11) which is carried by a first person (10), wherein the first data reference an image (12) of the first person (10); receiving second data from a second mobile hearing system (21) which is carried by a second person (20), wherein the second data reference an image (22) of the second person (20); depicting the image (12) of the first person (10) and the image (22) of the second person (20) on the screen (3) for perception by the speaker (1); selecting a person (10, 20) by the speaker (1) by choosing one of the depicted images (12, (Continued)

22); generating a speech signal by recording speech of the speaker (1) with the microphone (4); wireless transmission of the speech signal to the mobile hearing system (11, 21) of the selected person (10, 20); and presentation of the speech signal by a loudspeaker of the mobile hearing system (11, 21) for perception by the selected person (10, 20).

13 Claims, 3 Drawing Sheets

(51) Int. Cl.
*H04W 4/80* (2018.01)
*H04L 12/18* (2006.01)
*H04L 29/06* (2006.01)
*H04R 3/12* (2006.01)
*H04R 5/04* (2006.01)
*H04W 12/02* (2009.01)
*H04W 12/033* (2021.01)

(52) U.S. Cl.
CPC ............... *H04R 3/12* (2013.01); *H04R 5/04* (2013.01); *H04W 4/80* (2018.02); *H04W 12/02* (2013.01); *H04W 12/033* (2021.01); *H04W 76/10* (2018.02); *H04R 2420/07* (2013.01)

(56) References Cited

U.S. PATENT DOCUMENTS

| | | | |
|---|---|---|---|
| 2012/0252411 A1* | 10/2012 | Johnsgard | G07C 9/37 455/411 |
| 2016/0150575 A1* | 5/2016 | Andersen | H04W 76/10 370/329 |

FOREIGN PATENT DOCUMENTS

| | | |
|---|---|---|
| EP | 3021545 A1 | 5/2016 |
| EP | 3038383 A1 | 6/2016 |
| WO | 2007/046748 A1 | 4/2007 |
| WO | 2015/001135 A2 | 1/2015 |

OTHER PUBLICATIONS

Borowski, Michael (Authorized Officer), International Search Report dated Apr. 30, 2018 in corresponding PCT Application No. PCT/EP2018/052764.

* cited by examiner

METHOD FOR PROVIDING SOUND TO PERSONS DURING A TALK AND SYSTEM FOR PERFORMING THE METHOD

CROSS-REFERENCE TO RELATED APPLICATION(S)

This application is a national stage entry from International Application No. PCT/EP2018/052764, filed on Feb. 5, 2018, published as International Publication No. WO 2018/153642 A1 on Aug. 30, 2018, and claims priority under 35 U.S.C. § 119 from Swiss Patent Application No. 00209/2017 filed Feb. 23, 2017, the entire contents of all of which are incorporated herein by reference.

TECHNICAL FIELD

The invention relates to the field of hearing devices. It relates in particular to a method for the broadcasting of sound to persons with mobile hearing systems at a meeting. The invention furthermore relates to a sound-broadcasting system for carrying out the method.

PRIOR ART

Mobile hearing systems are systems which are carried by individuals and which help them to hear. They can have in particular one or two hearing devices. Hearing devices are devices which serve to compensate for the hearing loss of someone who is hard of hearing and improve his or her hearing. They substantially comprise a microphone, an amplifier and what is known as an earpiece (loud speaker) and are worn on one or both ears of the person who is hard of hearing.

It is known in the case of points of sale, information centres and/or offices to provide special broadcasting of sound for those who are hard of hearing. An inductive hearing system can, for example, be provided which transmits sound wirelessly to hearing devices.

In the following patent literature references, the "et al." is omitted in each case for the sake of simplicity.

US 2016/150575 from Andersen discloses point-to-point speech transmission. The user interface displays images of the users of the system.

US 2003/165239 from Bantz discloses broadcasting of sound to selected persons. The sound data are transmitted in an encrypted form to hearing devices so that only owners of the key can listen.

WO 2007/046748 A1 from Pansell discloses an encrypted transmission of sound for people who are hard of hearing.

WO 2015/001135 from El-Hoiydi discloses a broadcast system in the case of which listening is only possible with a Stream Access Code.

EP 2 866 470 A1 from Pedersen discloses a streaming between a POS (Point of Sale) and a hearing device.

EP 3 021 545 A1 from Pedersen discloses broadcast messages with precautions which allow their authenticity to be checked.

DE 10 2007 053832 A1 from Kiepfer discloses the use of a camera in hearing device selection. The customer can see what a future hearing device looks like on his or her head.

EXPLANATION OF THE INVENTION

The technical object on which the invention is based is to create a method for the broadcasting of sound to persons which protects the private sphere of the individual persons and is simultaneously user-friendly.

This object is achieved by the subject matter of the independent claims. Further embodiments of the invention will become apparent from the dependent claims and from the following description.

One aspect of the invention relates to a method for the broadcasting of sound to persons with mobile hearing systems at a meeting with a speaker and with an audiovisual system, the audiovisual system having a computer, a screen and a microphone. The audiovisual system can be used by the speaker in order to communicate with the persons. For example, the meeting can take place in a point of sale, an information centre and/or an office. The speaker can be an attendant.

The persons can be persons who are hard of hearing and/or customers who are hard of hearing.

Each of the mobile hearing systems can comprise a hearing device.

The audiovisual system can be a stationary system. The computer, the screen and/or the microphone can be associated with the building in which the meeting take place. It is, however, also possible that the audiovisual system is portable.

According to one embodiment of the invention, the method comprises the steps: receiving first data from a first mobile hearing system which is carried by a first person, wherein the first data reference and/or contain an image of the first person; receiving second data from a second mobile hearing system which is carried by a second person, wherein the second data reference and/or contain an image of the second person; and depicting the image of the first person and the image of the second person on the screen for perception by the speaker. The data can be transmitted with a communication means, such as a wireless communication link, for example, via radio and/or infrared, between the mobile hearing systems and the audiovisual system. The image of the first person and the image of the second person can be portrait photos. "Reference" can mean that the corresponding image is transmitted as image data with the data and/or that the data contain an identifier with which the image can be loaded later, for example, from the mobile hearing system, the audiovisual system and/or a further system.

According to one embodiment of the invention, the method further comprises the steps: selecting a person, i.e. the first person or the second person, by the speaker by choosing one of the depicted images, i.e. of the image of the first person or the image of the second person; generating a speech signal by recording speech of the speaker with the microphone; wireless transmission of the speech signal to the mobile hearing system of the selected person; presentation of the speech signal by a loudspeaker of the mobile hearing system for perception by the selected person. Once the speaker has selected a person, the speech signal of the speaker recorded by the microphone is transmitted to the mobile hearing system of the relevant person and played there.

In summary, the audiovisual system presents the speaker with images or portrait photos of the persons waiting. The speaker selects the person with whom he or she wants to speak or wants to serve. The sound of his or her voice can then be transmitted wirelessly only to the mobile hearing system of these selected persons.

According to one embodiment of the invention, the image of the first person and the image of the second person are stored together with in each case one identifier in a database which is accessed via the Internet. This can have the advantage that only the identifier has to be transmitted between the mobile hearing system and the audiovisual system. The audiovisual system can comprise the database and/or can call up the images from the database. It is, however, also possible that the image of the first person is stored in the mobile hearing system and/or the image of the second person is stored in the second mobile hearing system.

According to one embodiment of the invention, the first and the second data contain in each case an identifier with which the image of the first person and the image of the second person are called up from a database. The mobile hearing systems only have to transmit the identifier to the audiovisual system. With this identifier, the audiovisual system can call up the image associated with the identifier from the database.

According to one embodiment of the invention, the first data and the second data are in each case a Bluetooth identifier or contain such a Bluetooth identifier. This can have the advantage that no Bluetooth pairing is necessary. It is possible that the Bluetooth identifier is used as an identifier of the images in the database.

According to one embodiment of the invention, the image of the first person is stored in the first mobile hearing system and the image of the second person is stored in the second mobile hearing system. This can have the advantage that no Internet connection is necessary and/or the person does not have to leave a data trace on the Internet.

According to one embodiment of the invention, the wireless transmission of the speech signal is carried out according to a Bluetooth protocol. This can have the advantage that low-cost standard components can be used.

According to one embodiment of the invention, the audiovisual system has a camera. The camera can record the region in front of the speaker and/or the region in which the persons are located and thus generate a camera image. The camera image can be analysed as to which person is standing opposite the speaker, wherein face detection is carried out. The image of the first person and the image of the second person can be used for face detection. The image of the first person and the image of the second person can be in each case portrait photos which are compared with the camera image. In the case of maximum correspondence between the image of the relevant person and the camera image, it can be assumed that the relevant person is standing in front of the camera.

According to one embodiment of the invention, hash values of the image of the first person and of the image of the second person are used for comparison with the camera image. In the case of maximum correspondence between the hash value of the image of the relevant person and the hash value of the camera image, it can be assumed that the relevant person is standing in front of the camera.

In summary, the audiovisual system can have a camera and face detection is carried out. This can have the advantage that the activation of the wireless speech transmission for the respective person can be carried out automatically. It can furthermore be detected whether the wearer of the hearing system or the person is also its lawful owner.

According to one embodiment of the invention, the stationary system has a personal microphone. The microphone of the speaker can in this case be considered as a speaker microphone. The personal microphone can record sound from the region in front of the speaker.

According to one embodiment of the invention, a signal of a personal microphone is analysed as to which person is standing opposite the speaker, wherein voice detection is carried out. Here, first and second speech recordings of the first and the second person can be used for voice detection. These speech recordings and/or their hash values can be stored in the database under the respective identifier. In the case of maximum correspondence between the speech recording of the person and the signal of the personal microphone, it can be assumed that the relevant person is standing in front of the personal microphone.

According to one embodiment of the invention, the hash values of the speech recordings are used for voice detection. In the case of maximum correspondence between the hash value of the speech recording of the person and the hash value of the signal of the personal microphone, it can be assumed that the relevant person is standing in front of the personal microphone.

In summary, the audiovisual system has a personal microphone and voice detection is carried out. This can have the advantage that activation of the wireless speech transmission for the respective person can be carried out automatically.

According to one embodiment of the invention, the audiovisual system has an interim memory for the images of the persons. This can have the advantage that the images do not first have to be transmitted from the Internet or from the hearing devices in the case of a second speech process.

According to one embodiment of the invention, the method further comprises the steps: determining whether there is a correlation of a predetermined minimum magnitude between a signal of a microphone of a mobile hearing system and a signal of the microphone of the speaker; and depending on this, presentation of the signal of the microphone by the mobile hearing system. It is determined whether there is a correlation between a signal of a microphone of the mobile hearing system and a signal of the microphone of the speaker. This opens up the possibility of presenting a wireless signal to persons even if a person with normal hearing would perceive the voice of the speaker.

The signals of the microphones of the mobile hearing systems can be correlated with the signal of the speaker microphone (for example, by cross-correlation) and a correlation can be calculated. The correlation can be a numerical value.

A further aspect of the invention relates to a computer program, which, if it is executed on a processor, is embodied to carry out the method, as described above and below. A further aspect of the invention relates to a computer-readable medium on which such a computer program is stored. A computer-readable medium can be a hard disc, a USB storage device, a RAM, a ROM, an EPROM or a FLASH memory. A computer-readable medium can also be a data communication network such as, for example, the Internet which enables the download of a program code.

A further aspect of the invention relates to a sound-broadcasting system for carrying out the method for sound-broadcasting as described above and below. The sound-broadcasting system comprising the audiovisual system, the first mobile hearing system, the second mobile hearing system and means for communication between the audiovisual system and the mobile hearing systems.

The figures merely show by way of example several possible embodiments. They and their subsequent description should not restrict the scope of protection of the claims.

Ways to Carry Out the Invention and Commercial Applicability

Figure 1:
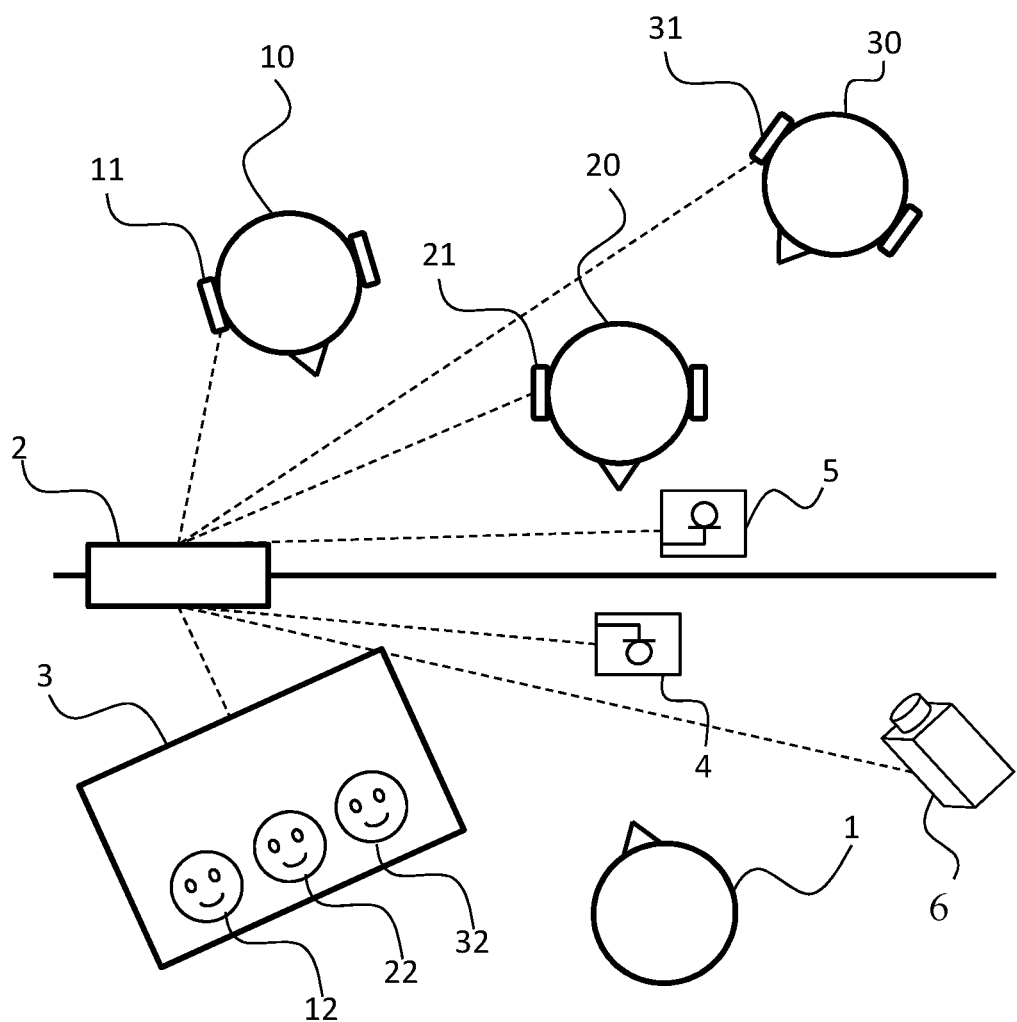
FIG. 1 schematically shows the situation in the case of a meeting of a point of sale, information centre and/or office with a sound-broadcasting system according to one embodiment of the invention.

FIG. 1 schematically shows the situation at a meeting, for example, at a point of sale, information centre and/or office, referred to below as a counter. Three persons 10, 20, 30, for example, customers who are hard of hearing, are waiting to be served by an attendant or speaker 1. Persons 10, 20, 30 carry in each case a mobile hearing system 11, 21, 31. The counter is equipped with an audiovisual sound-broadcasting system. This comprises a computer 2, a screen 3 and a speaker microphone 4. A personal microphone 5 as well as a personal camera 6 can optionally also be provided. Microphones 4, 5 and camera 6 can be stationary. Images, such as portrait photos, 12, 22, 32 of persons 10, 20, 30 are displayed on screen 3. Speaker 1 selects image 22 of person 20 with whom he or she wants to communicate. If he or she has done this, the sound of his or her voice is transmitted wirelessly to hearing system 21 of the person.

Figure 2:
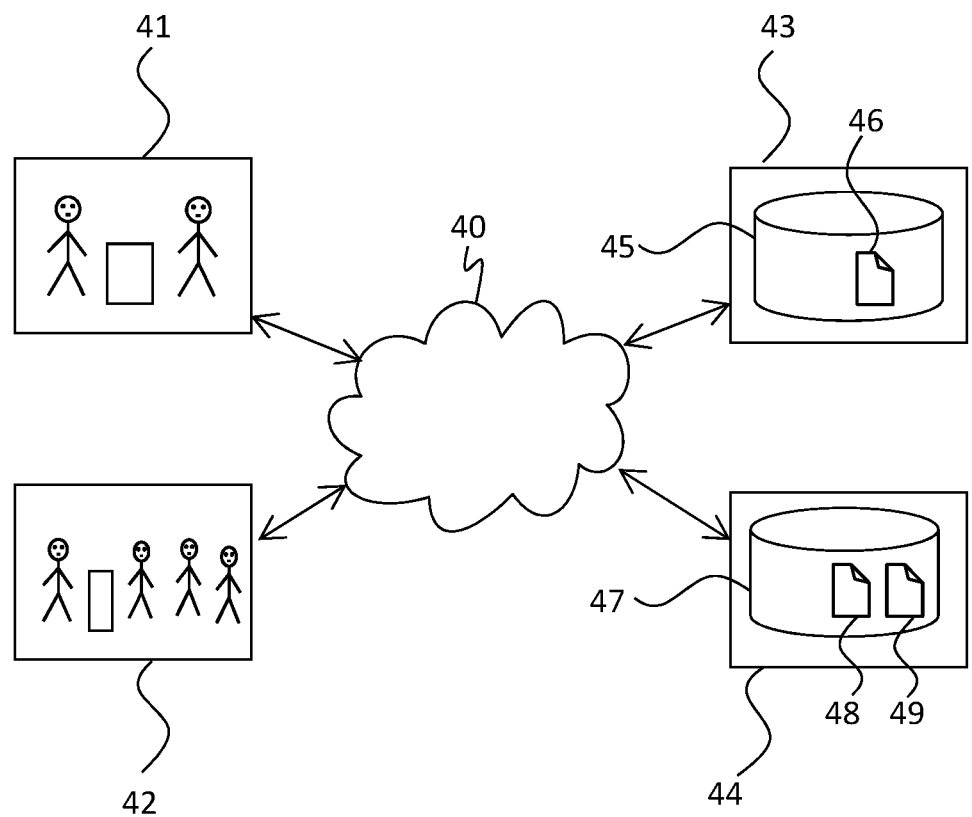
FIG. 2 shows a block diagram of a sound-broadcasting system according to one embodiment of the invention.

FIG. 2 shows a block diagram of the sound-broadcasting system according to one embodiment of the invention. An image or portrait photo 46 of the person is made in a hearing device adjustment space 41. This is transmitted via Internet 40 to a server 43 and stored there in a database 45. If the customer is supposed to be served at counter 42, his or her image 46 is firstly called up from server 43. Further servers, such as, for example, server 47, can be provided which also have databases, for example, 47, with images and/or portrait photos, for example, 48 and 49.

Figure 3:
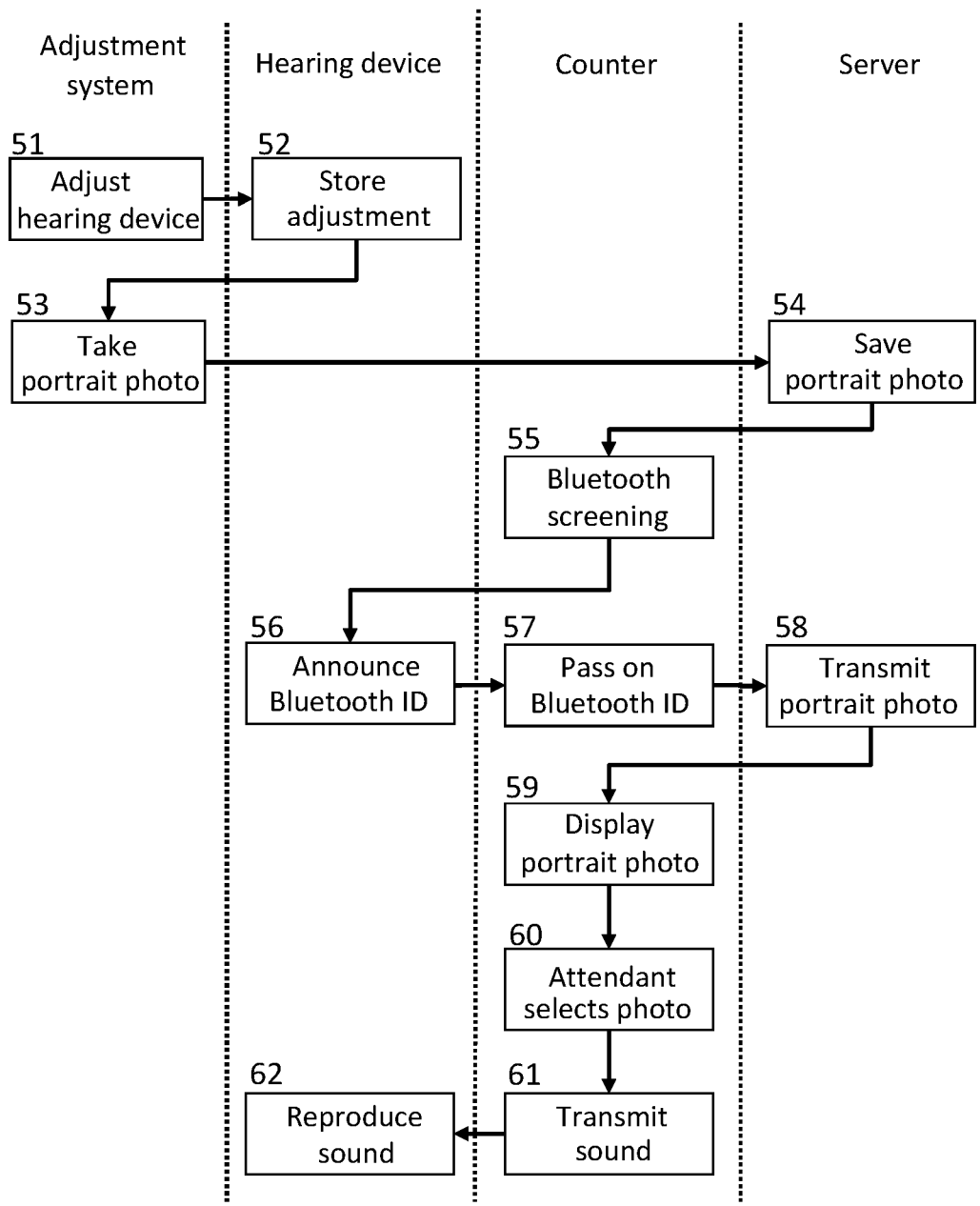
FIG. 3 shows a flow chart of the broadcasting of sound to a person according to the invention.

FIG. 3 shows a flow chart of a method for the broadcasting of sound to a person. There are four "swimming lanes" or executing sub-systems, namely the adjustment system, the hearing device or hearing system, the counter and a server. In a first step 51, a mobile hearing system is adjusted to a person, for example, by the virtue of the fact that his or her audiogram is measured and the frequency- and volume-dependent amplification is set with an adjustment formula. The adjustment is stored in the hearing device in step 52. An image or portrait photo of the person is also made in the same session, step 53. This can be stored in the hearing device, hearing system and/or on a server, step 54. The audiovisual sound-broadcasting system of a counter permanently carries out screening for Bluetooth devices, step 55. The mobile hearing system periodically announces its readiness for Bluetooth pairing, step 56. A Bluetooth ID can be sent out in this case. In step 57, the audiovisual sound-broadcasting system receives the Bluetooth ID and passes it on to the server. In step 58, this transmits the associated image or portrait photo. This is then displayed on the screen of the counter together with the images of further persons, step 59. Steps 51 to 59 are carried out in an analogous manner for the further persons. The speaker selects the person with whom he or she wants to speak by choosing his or her portrait photo, step 60. The voice of the speaker is thereupon transmitted wirelessly to the hearing device of the selected persons, step 61, and presented to the person, step 62.

Recording images or portrait photos: The portrait photos are preferably recorded during, directly before or directly after the initial hearing device adjustment. The adjustment software can have special precautions for this purpose, such as code for the response of a webcam or code for the representation of an operating element to trigger recording with the webcam. The webcam can be a separate component, or, as in the case of a smartphone, be installed in the adjustment computer. In the case of use of a separate digital camera, the portrait photo is typically transferred to the adjustment computer with a memory card or a memory stick. The adjustment software can have code for automatic passing on of the image or portrait photo to a server. The adjustment software can be configured for operation by an expert and/or for operation by the person himself or herself. The adjustment software can be configured for execution on a conventional PC or on a mobile device such as a smartphone or a tablet computer, i.e. in particular for Microsoft Windows and/or Android. The server can also have a website interface via which the authorised Internet user can upload images or portrait photos to the server.

Storage of the images or portrait photos: The images or portrait photos can be stored in a database which can be queried via the Internet. There can also be several databases, for example, from various hearing device manufacturers. A central server can pass on queries to the various databases, either in a targeted manner or in a broadcast mode. In the case of services which are distributed across various servers, the term "cloud" is also used. Storage on a server is carried out together with a person or hearing system identifier with which the image or portrait photo can be called up again. The portrait photos can alternatively or additionally be stored in the mobile hearing system. This variant has the advantage that the counter does not have to have an Internet connection. Intermediate storage (caching) of the portrait photos in the audiovisual sound-broadcasting system of the counter is furthermore possible. This has the advantage that a portrait photo which has been called up once does not have to called up again from the server. As a result, the system responds more rapidly and functions at least temporarily offline. Finally, the portrait photos can also be stored in the patient database of the adjustment software which is typically operated by the acoustician.

Additional data: Further data can be stored together with the portrait photos on the server and transmitted to the audiovisual sound-broadcasting system of the counter. Examples of this include the name and date of birth of the person, voice recordings or hash valves of the voice and hash values of the face.

Display of the images or portrait photos: The images or portrait photos of the persons in front of the counter are displayed on a screen. The image display can only occupy the edge of the screen so that other applications can still be operated at the same time, for example, in the form of a band. A separate screen only for the images or portrait photos is, however, also possible. The images or portrait photos can be ordered, for example, by priority or the probability that the attendant wants to speak to the respective person. The spatial distance between the customer and counter and/or the time of arrival of the person can be determined for this purpose. Another depiction variant is augmented reality. There are marked on an image of the situation in front of the counter faces of persons, for example, with a circle which displays that a wireless audio connection can be established for these persons. Rules can optionally be defined according to which specific persons are not displayed at all.

Displaying additional information: When displaying the images or portrait photos, additional information can be represented, such as, for example, the names of the persons, the language or languages of the persons, the date of the last visit, last item bought, names and portrait photos of family members or other texts and icons. The additional information can be transmitted by the mobile hearing system or the hearing devices, stored in the audiovisual system and called up from a database or a server.

Selection of the images or portrait photos: Selection is preferably carried out by clicking or touching, the latter only being possible in the case of a touchscreen.

Deselection can also be carried out by clicking or touching the same or a different person. More than one person can also optionally be selected. Rules can optionally also be defined, according to which specific persons are selected automatically. In particular, family members of a person can be selected automatically with the persons. Selection of an image or portrait photo can, in addition to the activation of the transmission of sound, also have the consequence that an electronic file of the person is opened.

Security: The person and/or his or her acoustician preferably has the possibility of deactivating and reactivating the functionality with the portrait photo, both temporarily and permanently. The functionality can furthermore also only be activated for trusted organisations, i.e., for example, only for public transport counters or only for a specific bank. A public key infrastructure can be used in this case. The public keys or certificates of the trusted organisations are stored in the mobile hearing system. The data transmitted by the mobile system to the audiovisual system (the identifier and/or the image or portrait photo) can be encrypted with the public key of the audiovisual system or the associated organisation. The mobile hearing system and in particular the hearing devices are furthermore equipped with a private key so that the audiovisual system can check the legitimacy, authenticity and genuineness of the mobile system. The certificate required in this case can be stored in the mobile hearing system and/or on a server. The adjustment software preferably has means which make it possible to administer digital keys and certificates. The sound data transmitted by the audiovisual system to the mobile system and/or a session key for symmetrical encryption can be encrypted by the audiovisual system with a public key of the mobile system, so that, apart from the selected persons, no one can "listen in" in an unauthorised manner with technical aids. The entire data exchange between mobile, audiovisual and remote system can be logged and/or analysed which makes it possible to detect non-permitted actions or cyber attacks.

Mobile hearing system: The mobile hearing system has at least one hearing device. However, it typically comprises two hearing devices and a smartphone (or another smart device such as a tablet or media player), wherein the three devices communicate with one another via Bluetooth or WLAN, i.e. 2.4 GHz. A proprietary inductive wireless method is often also used for communication between the two hearing devices because the Bluetooth signal is to a large extent blocked by the head. The images or portrait photos can be stored both in the hearing devices and in the smartphone. In the case of two hearing devices, one can act as a master and communicate with the audiovisual system (send identifier, receive sound data). It can also be advantageous for uniform battery load if the master role and the slave role are changed periodically. In the case of some hearing devices, a "relay device", such as, for example, a Phonak iCOM, which converts a proprietary wireless standard of the hearing devices into a public standard such as Bluetooth, is required for communication with the smartphone.

Audiovisual computer: The audiovisual sound-broadcasting system preferably comprises a personal computer with a Bluetooth dongle or inbuilt Bluetooth function and with a screen. The screen can be a touchscreen which enables intuitive selection of the images or portrait photos.

Identifier for images or portrait photos: This can be a Bluetooth ID, either of a hearing device or of a smartphone. A different universally unique number is, however, also possible which specifically serves the purpose of portrait photo identification. An identifier which contains personal data such as names and dates of birth is less suitable in terms of data protection.

Wireless speech transmission: Wireless speech transmission from the audiovisual sound-broadcasting system of the counter to the mobile hearing system is preferably carried out via Bluetooth, in particular Bluetooth Low Energy. The computer of the counter can be equipped with a Bluetooth dongle for this purpose. Other wireless technologies are, however, also possible, for example, FM, WiFi, WLAN, GSM, UMTS, NFC, LTE, induction loop, infrared and ultrasound, wherein various combinations are also possible. Various transmission techniques and configurations are possible in the case of a binaural hearing system. Both hearing devices can receive the sound directly from the audiovisual system. Alternatively, a hearing device can function as a relay station or master and pass on the sound to the second hearing device. Moreover, a smartphone can also function as a relay station and pass on the sound to both hearing devices in particular separately. In the case of one special solution, a device actively maintains a Bluetooth connection while a second device passively listens in (eavesdropping).

Automation: The system can also be configured so that it automatically detects with which person the attendant is likely to want to speak to at the time. Additional sensors are advantageous for this purpose.

Personal camera: A camera can be provided which records the region in front of the counter. The image provided by the camera can be used for augmented reality and automatic selection of communication partners.

Augmented reality: As already mentioned, the image provided by the personal camera can be provided with augmented reality. Faces can be emphasised and/or framed. The faces can also be assigned to a person by means of face detection and provided with a name.

Face detection: The images or portrait photos from the database can be used for face detection. Face detection can be carried out on a server, in particular on the same server which also provides the face database. Complete images or portrait photos can be transmitted for this purpose. It can, however, also be sufficient to transmit hash values of the face. It is also conceivable to not store the entire images or portrait photos in the database, rather only the associated hash values, which improves data protection.

Personal microphone: A microphone can be provided which records the sound directly in front of the counter. This sound can be supplied to voice detection which can be carried out in an analogous manner to face detection on the server. It can thus be determined who is standing or speaking at the time in front of the personal microphone. Voice samples and/or hash values thereof can be stored on the server for this purpose.

Automatic person selection: It can be determined with the personal camera and face detection where the respective persons are standing and in the case of which person one can assume on the basis of his or her position that he or she should now be served. The audiovisual system can automatically establish a connection to the mobile system of this person. All this also applies in an analogous manner to the personal microphone and voice detection.

Sound correlation: An alternative variant of the wireless sound activation functions as follows: The sound of the speaker is, in a broadcast mode, supplied to all the mobile hearing systems in the waiting area of the counter. The respective hearing systems check whether there is a correlation between received wireless sound and the signal of the hearing device microphones. If there is such a correlation with a predetermined minimum level, the wireless sound is supplied via the hearing device earpieces to the persons who are hard of hearing. One can thus replicate the situation or the confidentiality which one would have if the hearing device wearer were not hard of hearing.

Pairing/Establishing a connection: The mobile and the audiovisual system must "find" one another (pairing). This is generally achieved such that a first system functions periodically as a beacon (lighthouse) and the second system permanently looks out for beacons (screening). Permanently looking out uses more power. It is therefore expedient that the audiovisual system, which practically has unlimited power, is on the look out and the mobile system, which only has limited power, periodically issues a beacon signal. It is, however, also possible to swap these roles. It is furthermore possible to provide that the beacon only sends out signals if another criterion is satisfied, for example, a user action, the detection of a broadcast signal emitted from the counter or a specific location of the person which is determined, for example, with GPS. It is furthermore conceivable that the readiness for pairing of the audiovisual system is only activated when a movement sensor detects persons or the counter attendant performs a user action.

Solution without pairing: In the case of one preferred embodiment of the invention, no complete Bluetooth pairing is necessary. It is adequate if the mobile hearing system communicates its Bluetooth ID to the audiovisual system. In the case of a different embodiment, the portrait image is stored in the mobile hearing system. In this case, the portrait image can be transmitted without pairing, either periodically or under certain conditions, such as a user action or the mobile hearing system detecting the person's own voice.

Position determination: It may be advantageous for various purposes if the overall system identifies location properties of the persons. Such a purpose of the above-mentioned pairing which is only carried out when the person is in the vicinity of the counter. Another purpose is the prioritization of the persons on the basis of their proximity to the counter. Various techniques are possible for position determination, for example: GPS, evaluation of signal strength (RSSI, Received Signal Strength), triangulation, depth camera (TOF/Microsoft Kinect), ultrasound run time, sound run time and sound volume at the location of the person (the voice of the speaker). Position determination can be carried out by the audiovisual system, by the mobile system or by an interaction of both systems.

Persons: In addition to persons who are hard of hearing, there can of course also be persons with normal hearing. If such a person is next up, no wireless sound is transmitted.

Counter: The method and the system can be used in various cases, for example, in the case of POS (points of sale) of all types, in the case of public transport ticket counters, in banks, in receptions in hotels and the like, in the case of kiosks, exhibition, trade show and market stands, in pharmacies and in the case of ticket sale points.

Speaker or attendant: Depending on the type of counter, there are different speakers or attendants, for example, counter officials, customer advisers, salespeople, receptionists, pharmacists, etc.

Duplex sound: The method and the systems relate among other things to the transmission of sound of the speaker to be perceived by persons who are hard of hearing. A solution is, however, also conceivable in which the opposite direction is also supported. The sound of the voice of persons can be recorded with the hearing device microphones and transmitted in particular via Bluetooth to the audiovisual system. A loudspeaker in the counter presents the sound in order to be perceived by the speaker.

Speakers or attendants who are hard of hearing: The speaker or attendant can also be hard of hearing. In this case, a connection from the audiovisual system to the mobile hearing system of the speaker is advantageous. The loudspeaker in the counter can be replaced or complemented by a direct wireless transmission to the mobile hearing system of the speaker.

Devices for persons with normal hearing: It may be the case that the speaker and the persons are separated from one another by a pane of glass. In this case, a microphone/amplifier/loudspeaker system can be provided for one or both communication directions. Parts of this system such as, for example, the speaker microphone can be used by both systems (that for persons with normal hearing and that for persons who are hard of hearing). When serving persons who are hard of hearing, parts of the system can be disabled for persons with normal hearing, for example, a loudspeaker which outputs the speech of the speaker in front of the counter.

Feedback: In the case of the primary embodiment of the invention, sound is recorded with a speaker microphone and output again via the hearing device earpiece. Feedback should not arise in this case. At the same time, however, the person's own voice can be amplified so that he or she can control his or her speech. Known measures such as restriction of amplification and/or replication of the feedback path with subsequent subtraction can be used here. In the case of a "Duplex" system, a semi-duplex variant can be more stable.

Smartphone: According to the present description, a hearing system can have a smartphone in addition to the hearing devices. The term "smartphone" is to be understood by way of example here. Another portable computer can also be used instead of the smartphone, such as, for example, a tablet computer (e.g. iPad), a smartwatch (e.g. iWatch), a notebook, a e-book reading device or a media player (e.g. iPod).

Although the claims relate to a method or a system for carrying it out, it should be pointed out that the invention can also be claimed in the form of one or more computer program products which comprise program commands for executing the indicated steps and are suitable for execution on the basis of various devices or combinations of devices, such as, for example, PCs, digital hearing devices, telephones, smartphones, remote controls and tablet computers.

In summary there is presented a method for the broadcasting of sound to customers who are hard of hearing (10, 20, 30) with mobile hearing systems (11, 21, 31) in the case of a point of sale, information centre and/or office with an attendant (1) and with a stationary system (2, 3, 4), the stationary system having a computer (2), a screen (3) and a stationary attendant microphone (4).

According to one embodiment of the invention, the method comprises the steps: storing a first portrait photo (12) of a first customer (10) who is hard of hearing;

storing a second portrait photo (22) of a second customer (20) who is hard of hearing; receiving first data from a first mobile hearing system (11) which is carried by the first customer (10); receiving second data from a second mobile hearing system (21) which is carried by the second customer (20); depicting the first portrait photo (12) and the second portrait photo (22) on the screen (3) for perception by the attendant (1); selecting a customer (10, 20) by the attendant (1) by choosing one of the depicted portrait photos (12, 22); generating a speech signal by recording speech of the attendant (1) with the stationary attendant microphone (4); wireless transmission of the speech signal to a mobile hearing system (11, 21) of the selected customer (10, 20); presentation of the speech signal by a loudspeaker of the mobile hearing system (11, 21) for perception by the selected customer (10, 20).

According to one embodiment of the invention, the first and second portrait photo (12, 22) are stored together with in each case one identifier in a database (45) which is accessed via the Internet (40). The first and second data are in each case an identifier with which an associated portrait photo (12, 22) is called from the database (45).

According to one embodiment of the invention, the first data and the second data are in each case a Bluetooth identifier or contain such a Bluetooth identifier.

According to one embodiment of the invention, the first portrait photo (12) is stored in the first mobile hearing system (11) and the second portrait photo (22) is stored in the second mobile hearing system (21). The first data contain the first portrait photo (12) and the second data contain the second portrait photo (22).

According to one embodiment of the invention, the wireless transmission of the speech signal is carried according to a Bluetooth protocol.

According to one embodiment of the invention, the stationary system (2, 3, 4) furthermore has a customer camera (6). The camera (6) records the region in front of the operator (1) and thus generates a camera image. The camera image is analysed as to which customer (10, 20, 30) who is hard of hearing is standing opposite the attendant (1), wherein face detection is carried out. Portrait photos (12, 22, 32) or hash values thereof are used for this purpose.

According to one embodiment of the invention, the stationary system (2, 3, 4) furthermore has a stationary customer microphone (5); wherein the stationary customer microphone (5) records sound from the region in front of the attendant (1); wherein a signal of the stationary customer microphone (5) is analysed as to which customer (10, 20, 30) who is hard of hearing is standing opposite the attendant (1), wherein voice detection is carried out. Speech recordings or hash values thereof are used for this purpose.

According to one embodiment of the invention, the stationary system (2, 3, 4) has an intermediate memory for portrait photos (12, 22, 32).

According to one embodiment of the invention, the method further comprises the steps: determining whether there is a correlation of a predetermined minimum magnitude between a signal of a microphone of a mobile hearing system (11, 21, 31) and a signal of the stationary attendant microphone (4); and as a function of this, presentation of the signal of the stationary attendant microphone (4) by the mobile hearing system (11, 21, 31).

A sound-broadcasting system for carrying out the method for the broadcasting of sound is furthermore presented.

According to one embodiment of the invention, the sound-broadcasting system comprises a camera for recording portrait photos (12, 22, 32); the stationary system (2, 3, 4) comprising a computer (2), a screen (3) and a stationary attendant microphone (4) for use by an attendant (1); a first mobile hearing system (11) comprising at least one hearing device for use by a first customer (10) who is hard of hearing; a second mobile hearing system (21) comprising at least one hearing device for use by a second customer (20) who is hard of hearing; a storage device for storage of the first portrait photo (12); a storage device for storage of the second portrait photo (22); and means for communication between the stationary system (2, 3, 4) and mobile hearing systems (11, 21).

It should additionally be pointed out that "comprising" does not exclude any other elements or steps and "one" does not rule out a multiplicity. It should furthermore be pointed out that features or steps which have been described with reference to one of the above exemplary embodiments can also be used in combination with other features or steps of other exemplary embodiments described above. Reference numbers in the claims should not be regarded as a restriction.

The invention claimed is:

1. A method for broadcasting sound to persons with mobile hearing systems at a meeting with a speaker using an audiovisual system, the audiovisual system having a computer, a screen and a microphone, the method comprising:
   receiving first data from a first mobile hearing system which is carried by a first person, wherein the first data contains an identifier that is used to access an image of the first person from a database, wherein the image of the first person is stored in the first mobile hearing system;
   receiving second data from a second mobile hearing system which is carried by a second person, wherein the second data contains an identifier that is used to access an image of the second person from the database, wherein the image of the second person is stored in the second mobile hearing system;
   depicting the image of the first person and the image of the second person on the screen for perception by the speaker;
   selecting one of the first person or the second person by the speaker by choosing one of the depicted images;
   generating a speech signal by recording speech of the speaker with the microphone;
   wirelessly transmitting the speech signal to the mobile hearing system of the selected person;
   presenting the speech signal using a loudspeaker of the mobile hearing system for perception by the selected person.

2. The method according to claim 1, wherein the image of the first person and the image of the second person are stored together with a respective identifier in a database which is accessible via the Internet.

3. The method according to claim 1, wherein the first data and the second data each comprise a Bluetooth identifier or contain such as a Bluetooth identifier.

4. The method of claim 1, wherein the wireless transmission of the speech signal is carried out according to a Bluetooth protocol.

5. The method according to claim 1, wherein the audiovisual system comprises a camera and the method further comprises:
   recording a region in front of the speaker using the camera; and
   generating a camera image using the camera.

6. The method according to claim 1, wherein:
   a camera image is analyzed as to which person is standing opposite the speaker, wherein face detection is carried out; and the image of the first person and the image of the second person are used for this purpose.

7. The method according to claim 6, wherein hash values of the image of the first person and of the image of the second person are used for comparison with the camera image.

8. The method according to claim 1, wherein:
the audiovisual system comprises a personal microphone; and
the personal microphone records sound from a region in front of the speaker.

9. The method according to claim 1, wherein:
a signal of a personal microphone is analyzed as to which person is standing opposite the speaker using voice detection; and
speech recordings of the first and second person are used for the voice detection.

10. The method according to claim 9, wherein hash values of the speech recordings are used for the voice detection.

11. The method according to claim 1, further comprising:
determining whether there is a correlation of a predetermined minimum magnitude between a signal of a microphone of a mobile hearing system and a signal of the microphone and
in dependence of this, presentation of the signal of the microphone by the mobile hearing system.

12. A non-transitory computer-readable medium storing a computer program which, when executed by a processor, performs a method comprising:
receiving first data from a first mobile hearing system which is carried by a first person, wherein the first data contains an identifier that is used to access an image of the first person from a database, wherein the image of the first person is stored in the first mobile hearing system;
receiving second data from a second mobile hearing system which is carried by a second person, wherein the second data reference contains an identifier that is used to access an image of the second person from the database, wherein the image of the second person is stored in the second mobile hearing system;
depicting the image of the first person and the image of the second person on the screen for perception by the speaker;
selecting a person by the speaker by choosing one of the depicted images;
generating a speech signal by recording speech of the speaker with the microphone;
wirelessly transmitting the speech signal to the mobile hearing system of the selected person; and
presenting the speech signal by a loudspeaker of the mobile hearing system for perception by the selected person.

13. A sound-broadcasting system for broadcasting sound to persons with mobile hearing systems at a meeting with a speaker, the sound-broadcasting system comprising:
an audiovisual system comprising a computer, a screen and a microphone;
a first mobile hearing system configured to be carried by a first person; and
a second mobile hearing system configured to be carried by a second person;
wherein the sound-broadcasting system is configured to:
receive first data from the first mobile hearing system, wherein the first data contains an identifier that is used to access an image of the first person from a database, wherein the image of the first person is stored in the first mobile hearing system;
receive second data from the second mobile hearing system, wherein the second data contains an identifier that is used to access an image of the second person from the database, wherein the image of the second person is stored in the second mobile hearing system;
depict the image of the first person and the image of the second person on the screen for perception by a speaker;
select one of the first person or the second person by the speaker by choosing one of the depicted images;
generate a speech signal by recording speech of the speaker with the microphone;
transmit wirelessly the speech signal to the mobile hearing system of the selected person;
present the speech signal to the selected person by a loudspeaker of either the first mobile hearing system upon selection of the first person or the second mobile hearing system upon selection of the second person.

* * * * *